United States Patent
Ku

(10) Patent No.: US 12,362,623 B2
(45) Date of Patent: Jul. 15, 2025

(54) COVER AND MOTOR COMPRISING SAME

(71) Applicant: LG Innotek Co., Ltd., Seoul (KR)

(72) Inventor: Ju Hwan Ku, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 204 days.

(21) Appl. No.: 18/251,022

(22) PCT Filed: Dec. 28, 2021

(86) PCT No.: PCT/KR2021/020059
§ 371 (c)(1),
(2) Date: Apr. 28, 2023

(87) PCT Pub. No.: WO2022/145977
PCT Pub. Date: Jul. 7, 2022

(65) Prior Publication Data
US 2023/0387745 A1    Nov. 30, 2023

(30) Foreign Application Priority Data

Dec. 28, 2020 (KR) .................. 10-2020-0184391

(51) Int. Cl.
*H02K 5/04* (2006.01)
(52) U.S. Cl.
CPC ...................................... *H02K 5/04* (2013.01)
(58) Field of Classification Search
CPC ........................................................ H02K 5/04
USPC ........................................................... 310/89
See application file for complete search history.

(56) References Cited

U.S. PATENT DOCUMENTS 5,497,040 A * 3/1996 Sato .................. H02K 21/22
310/67 R

FOREIGN PATENT DOCUMENTS

| CN | 203251204 U | 10/2013 | |
| EP | 671562 A2 * | 9/1995 | ............ F04C 23/008 |
| JP | S63268986 A1 * | 11/1998 | |
| JP | 2006197788 A * | 7/2006 | |
| JP | 2019062672 A | 4/2019 | |
| KR | 20090005076 U | 5/2009 | |
| KR | 20160066631 A | 6/2016 | |
| KR | 101655112 B1 | 9/2016 | |

OTHER PUBLICATIONS

International Search Report, dated Apr. 4, 2022, for PCT Application No. PCT/KR2021/020059.

* cited by examiner

*Primary Examiner* — Jose A Gonzalez Quinones
(74) *Attorney, Agent, or Firm* — Saliwanchik, Lloyd & Eisenschenk

(57) ABSTRACT

An embodiment provides a motor comprising: a housing having an opening; a stator disposed inside the housing; a rotor arranged to correspond to the stator; a shaft coupled to the rotor; and a cover arranged to cover the opening, wherein: the cover comprises a plate part, a protruding part formed to protrude from the plate in the axial direction, and a plurality of protrusions formed to protrude from the protruding part in the axial direction; and the thickness (T2) of the protrusions in the radial direction is larger than the thickness (T1) of the protruding part in the radial direction. Accordingly, through the structural shape of the cover, the motor can minimize foreign matter produced when the cover is press-fitted into the housing.

20 Claims, 8 Drawing Sheets

(a)

(b)

(c)

(d)

COVER AND MOTOR COMPRISING SAME

CROSS-REFERENCE TO RELATED APPLICATIONS

This application is the U.S. national stage application of International Patent Application No. PCT/KR2021/020059, filed Dec. 28, 2021, which claims the benefit under 35 U.S.C. § 119 of Korean Application No. 10-2020-0184391, filed Dec. 28, 2020, the disclosures of each of which are incorporated herein by reference in their entirety.

TECHNICAL FIELD

The present invention relates to a cover and a motor including the same.

BACKGROUND ART

Motors are apparatuses which obtain rotational forces by converting electrical energy into mechanical energy and are widely used in vehicles, home appliances, industrial equipment, and the like.

A motor may include a housing, a cover, a shaft, a stator disposed on an inner circumferential surface of the housing, a rotor installed on an outer circumferential surface of the shaft, and a busbar disposed on the stator. In this case, the stator induces an electrical interaction with the rotor to induce rotation of the rotor. In addition, the housing and the cover each may be formed of a metal material.

When the cover is coupled to the housing to cover an opening of the housing in a press-fit manner, there is a problem that an end portion of the cover comes into contact with the inner circumferential surface of the housing and generates debris such as a burr.

Since the burr may be separated and introduced into the motor, the burr may cause the motor to fail.

In addition, since the burr is caught between the cover and the housing, a pressing force for coupling the cover to the housing may be increased and also cause press-fit defects.

Accordingly, a motor which minimizes generation of debris when a cover is press-fitted into a housing and optimizes a pressing force for the cover against the housing is being required.

DISCLOSURE

Technical Problem

An embodiment is directed to providing a motor which minimizes generation of debris when a cover is pressed-fitted into a housing using a structural shape of the cover.

Objectives to be solved by embodiments are not limited to the objectives described above, and objectives which are not described above will be clearly understood by those skilled in the art from the following descriptions.

Technical Solution

One aspect of the present invention provides a motor including a housing in which an opening is formed, a stator disposed in the housing, a rotor disposed to correspond to the stator, a shaft coupled to the rotor, and a cover disposed to cover the opening, wherein the cover includes a plate, a protruding part formed to protrude from the plate in an axial direction, and a plurality of protrusions formed to protrude from the protruding part in the axial direction, and a radial thickness (T2) of each of the protrusions is greater than a radial thickness (T1) of the protruding part.

The radial thickness (T2) of the protrusion may be twice the radial thickness (T1) of the protruding part.

The cover may include a curved surface formed on a lower end of the protrusion to have a predetermined curvature, and a radius of curvature of the curved surface may be the same as the radial thickness (T1) of the protruding part.

The curved surface may be formed by bending one region of the protrusion.

The protrusion may include a first region extending downward from a lower surface of the protruding part in the axial direction and a second region bent upward from an end portion of the first region in the axial direction. In this case, the second region may be disposed in contact with an inner side of the first region.

The first region may include a 1-1 region extending downward from the lower surface of the protruding part in the axial direction and a 1-2 region extending from the 1-1 region, wherein the 1-2 region may be disposed to overlap the second region in a radial direction.

An end portion of the second region may be disposed to overlap a part of a lower portion of an inner circumferential surface of the protruding part in a radial direction.

A distance (d2) from a lower surface of the plate to an end portion of the second region may be smaller than a distance (d1) from the lower surface of the plate to the lower surface of the protruding part.

The plurality of protrusions may be disposed on a lower surface of the protruding part to have predetermined separation gaps in a circumferential direction, the separation gaps may include a first separation gap (G1) and a second separation gap (G2), and the first separation gap (G1) may be smaller than the second separation gap (G2).

The plurality of protrusions may be disposed on a lower surface of the protruding part to have predetermined separation gaps in a circumferential direction, the separation gaps may include a plurality of first separation gaps (G1) and a plurality of second separation gaps (G2), and the first separation gaps (G1) may be disposed symmetrically with respect to a virtual line (L) crossing a center (C).

The plurality of protrusions may be disposed on a lower surface of the protruding part to be separated from each other in a circumferential direction, two protrusions disposed adjacent to each other in the circumferential direction among the protrusions may be disposed to have a predetermined central angle, one protrusion and any one protrusion among two protrusions disposed adjacent to the one protrusion in the circumferential direction may be disposed to have a first central angle ($\theta 1$), the one protrusion and the other protrusion among the two protrusions disposed adjacent to the one protrusion in the circumferential direction may be disposed to have a second central angle ($\theta 2$), and the first central angle ($\theta 1$) may be smaller than the second central angle ($\theta 2$).

The plurality of protrusions may be disposed on a lower surface of the protruding part to be separated from each other in a circumferential direction, the plurality of protrusions may include first protrusions, second protrusions, and third protrusions, the first protrusion may be disposed between the second protrusion and the third protrusion in the circumferential direction, the first protrusion and the second protrusion may be disposed to form a first central angle ($\theta 1$) around a center (C), the first protrusion and the third protrusion may be disposed to form a second central angle ($\theta 2$) around the center (C), and the first central angle ($\theta 1$) may be smaller than the second central angle ($\theta 2$). In this case, the first protrusions, the second protrusions, and the third protrusions may be disposed symmetrically with respect to a virtual line (L) crossing the center (C).

One aspect of the present invention provides a cover including a plate, a protruding part formed to protrude from the plate in an axial direction, a plurality of protrusions formed to protrude from the protruding part in the axial direction, and a curved surface formed to have a predetermined curvature on a lower end of each of the protrusions, wherein the protrusion includes a first region extending downward from a lower surface of the protruding part in the axial direction and a second region bent upward from an end portion of the first region in the axial direction, the second region is disposed in contact with an inner side of the first region, and a radial thickness (T2) of the protrusion is greater than a radial thickness (T1) of the protruding part.

Advantageous Effects

An embodiment can minimize generation of debris when a cover is press-fitted into a housing using a structural shape of the cover. Specifically, the embodiment can minimize the generation of debris when the cover is press-fitted and optimize a pressing force for the cover against the housing using a protrusion of the cover In addition, an embodiment may induce smooth press-fitting of a cover by bending a part of a protrusion to form a curved surface. In this case, since the curved surface is formed by bending, an additional process of machining a corner such as chamfering may be eliminated. Accordingly, the productivity of the motor can be improved.

In addition, the embodiment can adjust a position of an end portion of the protrusion by adjusting a position of a region in which the protrusion is bent. Accordingly, when the cover is press-fitted into a housing, rigidity according to an elastic force and a support force of the protrusion can be adjusted using the position of the end portion of the protrusion.

Various useful advantages and effects of the embodiments are not limited to the above-described contents and will be more easily understood from descriptions of the specific embodiments.

MODES OF THE INVENTION

Hereinafter, exemplary embodiments of the present invention will be described in detail with reference the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
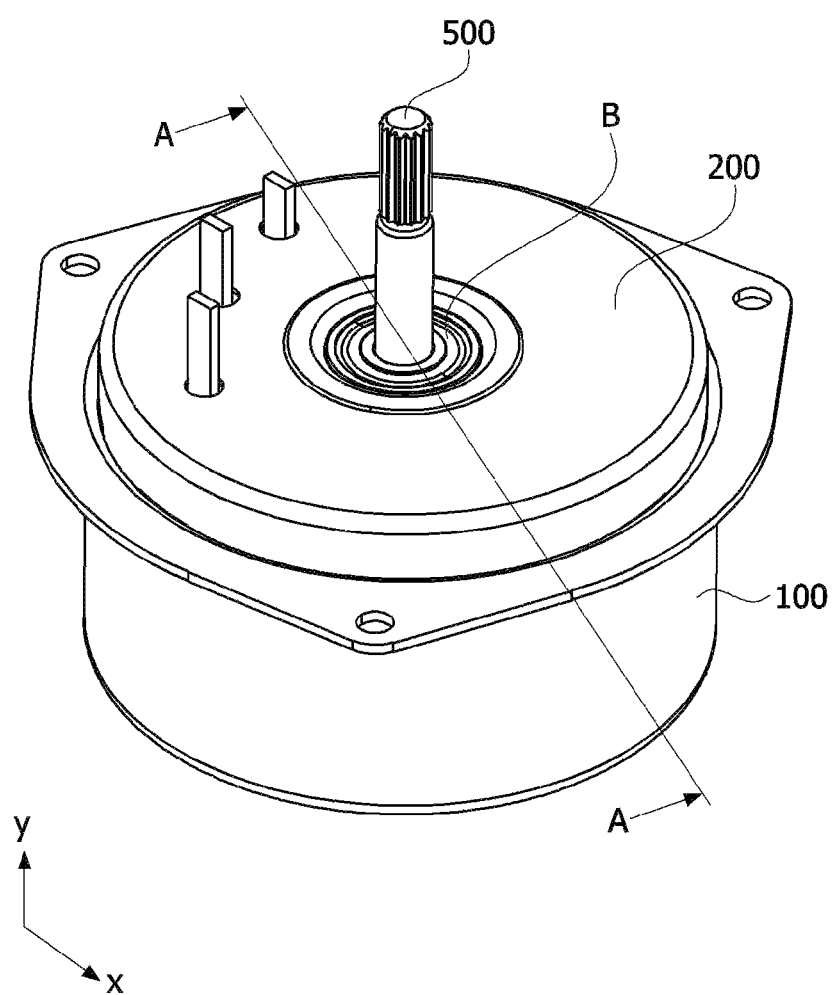
FIG. 1 is a perspective view illustrating a motor according to an embodiment.
Figure 2:
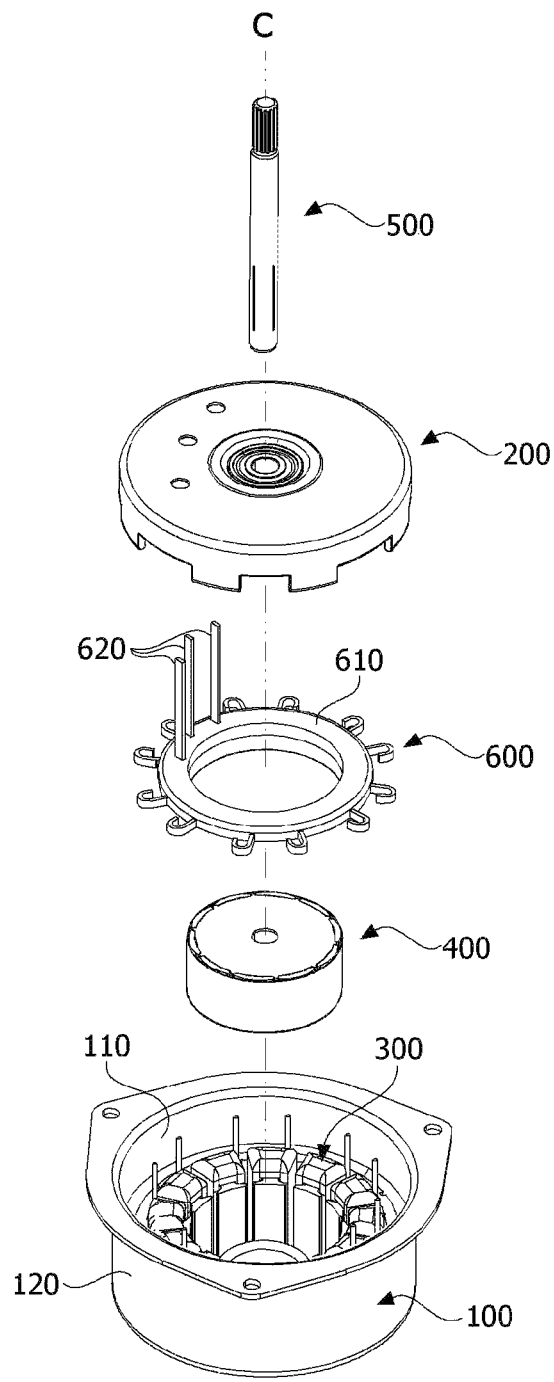
FIG. 2 is an exploded perspective view illustrating the motor according to the embodiment.
Figure 3:
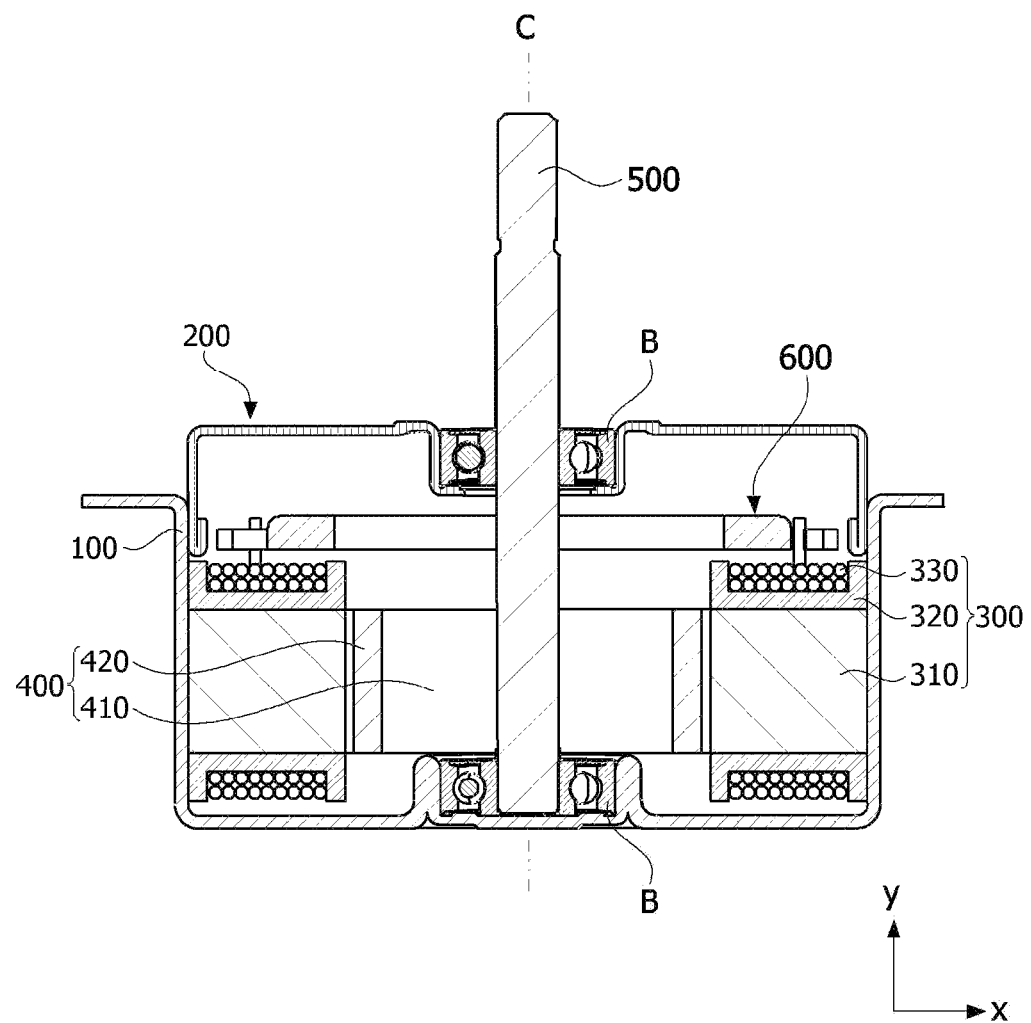
FIG. 3 is a cross-sectional view illustrating the motor according to the embodiment.

FIG. 1 is a perspective view illustrating a motor according to an embodiment, FIG. 2 is an exploded perspective view illustrating the motor according to the embodiment, and FIG. 3 is a cross-sectional view illustrating the motor according to the embodiment. In this case, FIG. 3 is a cross-sectional view along line A-A of FIG. 1.

In FIGS. 1 and 2, an x direction may be a radial direction, and a y direction may be an axial direction. In addition, the axial direction and the radial direction may be perpendicular to each other. In this case, the axial direction may be a longitudinal direction of a shaft 500. In addition, reference symbol "C" illustrated in FIGS. 1 to 3 may be a rotation center of the shaft 500.

Referring to FIGS. 1 to 3, the motor according to the embodiment may include a housing 100 in which an opening is formed at one side, a cover 200 disposed on the housing 100, a stator 300 disposed in the housing 100, a rotor 400 disposed inside the stator 300, a shaft 500 coupled to the rotor 400, and a busbar 600 disposed on the stator 300. In this case, the term "inward" may be a direction toward the rotation center C of the motor in the radial direction, and the term "outward" may be a direction opposite to "inward."

In addition, the cover 200 of the motor may be coupled to an opening side of the housing 100 in a press-fit manner. In this case, the motor may minimize the generation of debris such as a burr and optimize a pressing force applied to the cover 200 using a plurality of protrusions 230 formed on the cover 200 when the press-fit manner is applied.

The housing 100 and the cover 200 may form an exterior of the motor. In addition, an accommodation space may be formed in the housing 100 and the cover 200 when the housing 100 and the cover 200 are coupled. Accordingly, the stator 300, the rotor 400, the shaft 500, and the busbar 600 may be disposed in the accommodation space.

In this case, the shaft 500 is rotatably disposed in the accommodation space.

Accordingly, the motor may further include bearings B disposed on an upper portion and a lower portion of the shaft 500. In this case, the bearing B disposed in the housing 100 may be called a first bearing or a lower bearing, and the bearing B disposed in the cover 200 may be called a second bearing or an upper bearing.

The opening is formed at one side of the housing 100, and the housing 100 may be formed in a cylindrical shape including an inner circumferential surface 110 and an outer circumferential surface 120. In this case, a shape and material of the housing 100 may vary. For example, the housing 100 may be formed of a metal material having high resistance to high temperatures.

In addition, as illustrated in FIG. 3, the housing 100 may include a pocket portion capable of accommodating the bearing B at a lower portion. In this case, the pocket portion of the housing 100 may be called a housing pocket portion.

The cover 200 may be disposed on an open surface of the housing 100, that is, an upper portion of the housing 100 to cover the opening of the housing 100. In this case, the cover 200 may be called a bearing plate.

Figure 4:
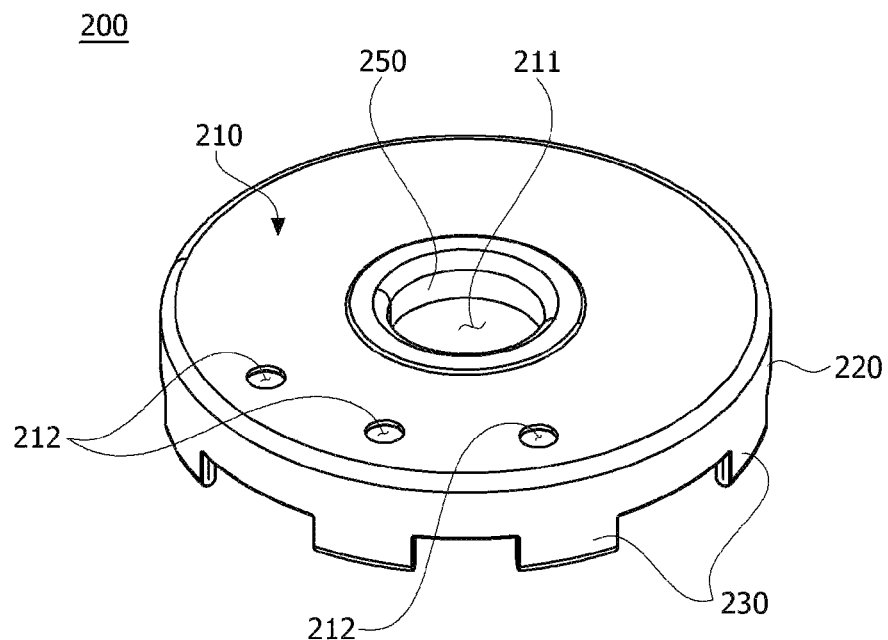
FIG. 4 is a perspective view illustrating a cover of the motor according to the embodiment.
Figure 5:
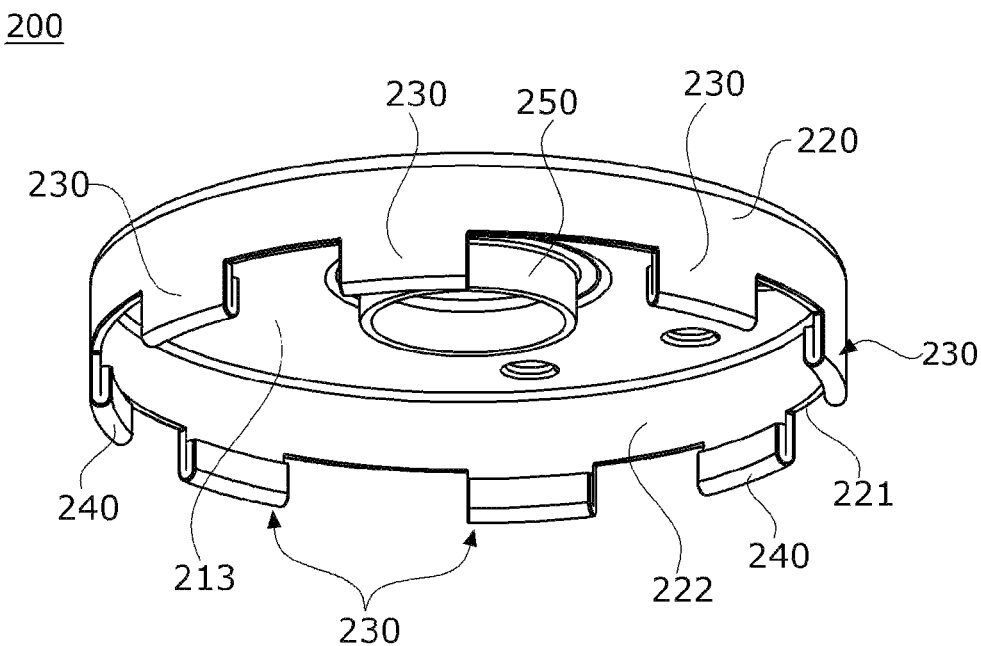
FIG. 5 is a bottom perspective view illustrating the cover of the motor according to the embodiment.
Figure 6:
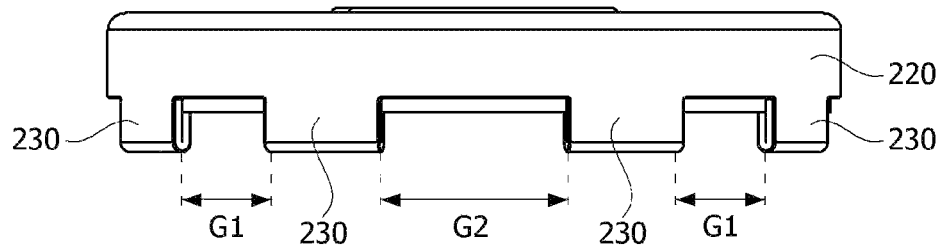
FIG. 6 is a front view illustrating the cover of the motor according to the embodiment.
Figure 7:
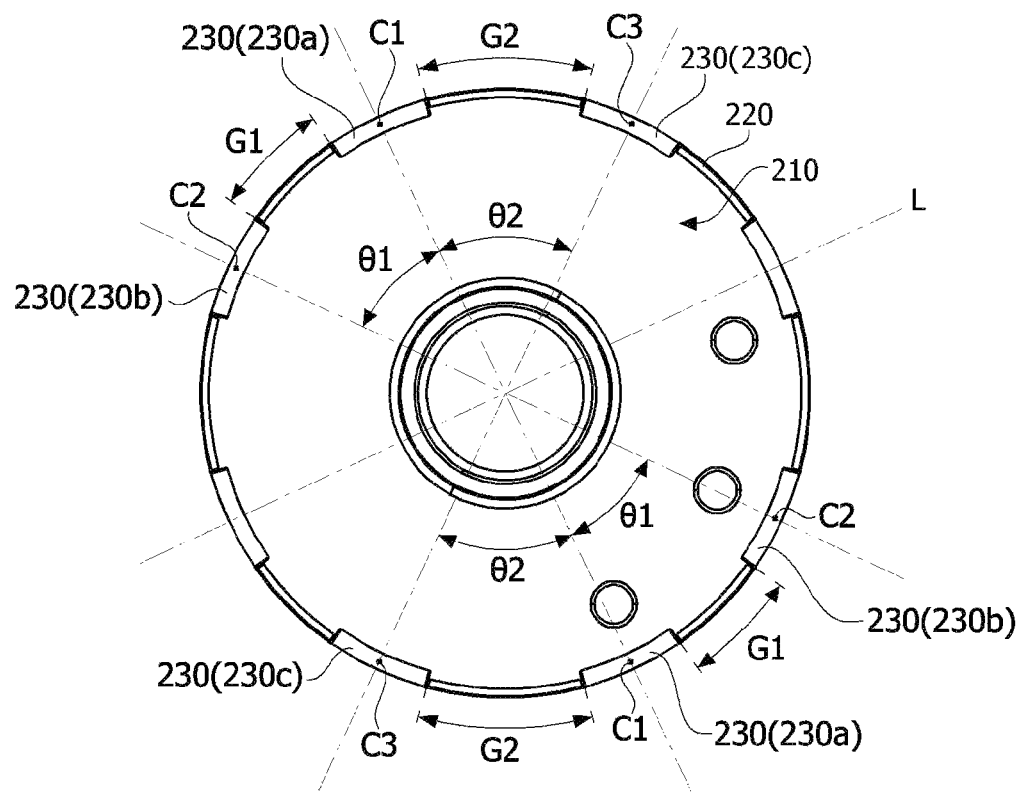
FIG. 7 is a bottom view illustrating the cover of the motor according to the embodiment.
Figure 8:
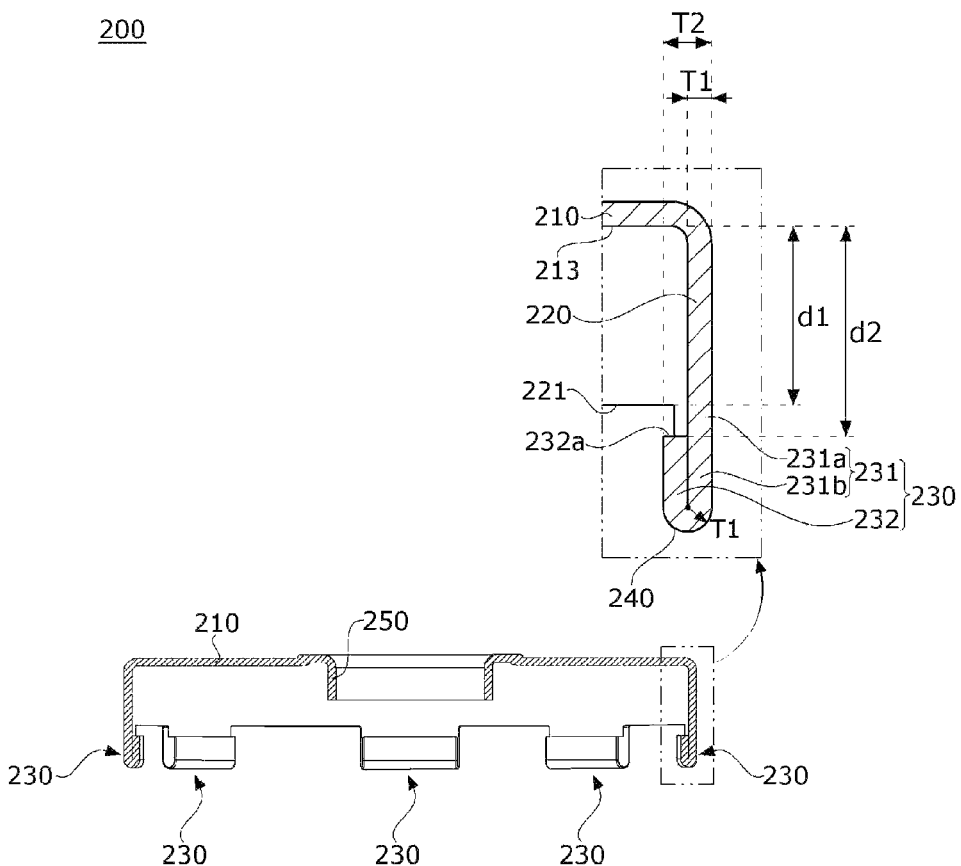
FIG. 8 is a cross-sectional view illustrating the cover of the motor according to the embodiment.
Figure 9:
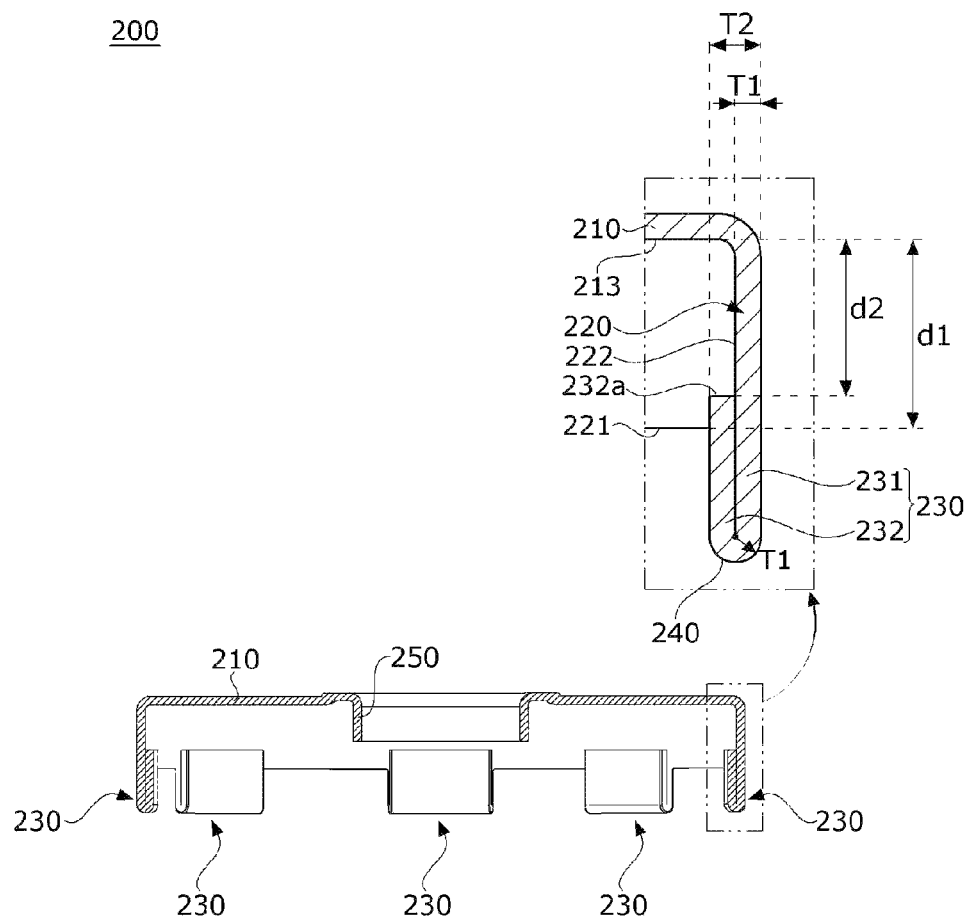
FIG. 9 is a cross-sectional view illustrating a modified example of a cover of a motor according to an embodiment.

FIG. 4 is a perspective view illustrating the cover of the motor according to the embodiment, and FIG. 5 is a bottom perspective view illustrating the cover of the motor according to the embodiment. FIG. 6 is a front view illustrating the cover of the motor according to the embodiment, and FIG. 7 is a bottom view illustrating the cover of the motor according to the embodiment. FIG. 8 is a cross-sectional view illustrating the cover of the motor according to the embodiment, and FIG. 9 is a cross-sectional view illustrating a modified example of a cover of a motor according to an embodiment.

Referring to FIGS. 4 to 9, the cover 200 may include a plate 210, a protruding part 220 formed to protrude from the plate 210 in the axial direction, and the plurality of protrusions 230 formed to protrude from the protruding part 220 in the axial direction. In addition, the cover 200 may include curved surfaces 240 formed to have predetermined curvatures on lower ends of the protrusions 230. In addition, the cover 200 may include a support 250 which supports the bearing B. In this case, the plate 210, the protruding part 220, the protrusions 230, the curved surfaces 240, and the support 250 may be integrally formed.

The plate 210 may be formed in a disc shape.

In addition, the plate 210 may include a first hole 211 and a second hole 212 formed to pass through the plate 210 in the axial direction.

The first hole 211 may be formed at a center of the plate 210, and the shaft 500 may be exposed to the outside through the first hole 211.

A plurality of the second holes 212 may be formed in a circumferential direction and may be disposed to be spaced apart from the first hole 211 in the radial direction. In addition, a part of a busbar terminal 620 disposed on the busbar 600 may be exposed to the outside through the second hole 212. That is, an end portion of one side of the busbar terminal 620 may pass through the second hole 212.

The protruding part 220 may extend from an outer circumferential surface of the plate 210 in the axial direction.

In addition, the protruding part 220 may be formed in a ring shape and may be called a sleeve. That is, the protruding part 220 may be formed to have a ring-shaped horizontal cross section. In this case, the protruding part 220 may be formed to have a predetermined radial thickness T1 in the radial direction. In this case, the radial thickness T1 of the protruding part 220 may be called a first thickness.

The plurality of protrusions 230 may be formed to protrude from a lower surface 221 of the protruding part 220 in the axial direction.

In this case, each of the protrusions 230 may be formed to have a predetermined radial thickness T2 in the radial direction. In addition, the radial thickness T2 of the protrusion 230 may be greater than the radial thickness T1 of the protruding part 220. For example, the radial thickness T2 of the protrusion 230 may be twice the radial thickness T1 of the protruding part 220. Accordingly, in the cover 200, each of the curved surfaces 240 may have a sufficient size due to the radial thickness T2 of the protrusion 230.

Since the protrusion 230 is formed in a plate shape having a predetermined width and the radial thickness T2, the protrusion 230 may have an elastic force.

Accordingly, when the cover 200 is coupled to the housing 100 in the press-fit manner, the cover 200 may be easily press-fitted into the housing 100 by the elastic force of the protrusion 230, and thus generation of debris such as a burr can be minimized. In addition, the cover 200 on which the protrusions 230 are formed may secure a greater pressing force than a cover on which only a protruding part 220 is formed. That is, the motor according to the embodiment may secure a coupling force between the housing 100 and the cover 200 using the protrusions 230.

Meanwhile, the protrusion 230 may be formed by bending a lower portion of a region protruding in the axial direction. Accordingly, the curved surface 240 may be formed at the lower end of the protrusion 230 by only bending without an additional machining process.

Referring to FIGS. 8 and 9, the protrusion 230 may include a first region 231 extending downward from the lower surface 221 of the protruding part 220 in the axial direction and a second region 232 bent upward from an end portion of the first region 231 in the axial direction. That is, an extension direction of the first region 231 and an extension direction of the second region 232 may be opposite to each other.

In addition, the second region 232 may be in contact with an inner side of the first region 231. Specifically, an outer side surface of the second region 232 may be in contact with an inner side surface of the first region 231.

In this case, a rigidity according to an elastic force and a supporting force of the protrusion 230 may be adjusted according to a position of an end portion of the second region 232.

Referring to FIG. 8, the first region 231 may include a 1-1 region 231a extending downward from the lower surface 221 of the protruding part 220 in the axial direction and a 1-2 region 231b extending downward from the 1-1 region 231a. In addition, the 1-2 region 231b may overlap the second region 232 in the radial direction. In this case, the 1-1 region 231a and 1-2 region 231b may be distinguished by a virtual line extending from an end surface 232a of the second region 232 in the radial direction. In this case, the end surface 232a may be a flat surface.

Accordingly, a distance d2 from a lower surface 213 of the plate 210 to the end portion of the second region 232 may be greater than a distance d1 from the lower surface 213 of the plate 210 to the lower surface 221 of the protruding part 220. In this case, the distance d1 from the lower surface 213 of the plate 210 to the lower surface 221 of the protruding part 220 may be called a first distance or first height. In addition, the distance d2 from the lower surface 213 of the plate 210 to the end portion of the second region 232 may be called a second distance or second height. That is, the first distance may be smaller than the second distance.

Accordingly, the cover 200 illustrated in FIG. 8 may secure a greater elastic force of the protrusion 230 than that of a modified example of a cover 200 illustrated in FIG. 9.

Referring to FIG. 9, an end portion of a second region 232 may be in contact with an inner circumferential surface 222 of a protruding part 220. For example, the end portion of the second region 232 may be disposed to overlap a part of a lower portion of the inner circumferential surface 222 of the protruding part 220 in a radial direction.

That is, a distance d2 from a lower surface 213 of a plate 210 to the end portion of the second region 232 may be smaller than a distance d1 from the lower surface 213 of the plate 210 to a lower surface 221 of the protruding part 220. Accordingly, a first distance may be greater than a second distance.

Accordingly, a modified example of the cover 200 illustrated in FIG. 9 may secure a greater rigidity of a protrusion 230 than that of the protrusion 230 of the cover 200 illustrated in FIG. 8. For example, when the cover 200 is press-fitted, a reaction force of the protrusion 230 may be generated when a housing 100 and the protrusion 230 come into contact with each other. In addition, since the end portion of the second region 232 is supported by the inner circumferential surface 222 of the protruding part 220 formed in a pipe shape due to the reaction force, a rigidity of the protrusion 230 for press-fitting of the cover 200 can be improved.

Accordingly, when the cover 200 according to one embodiment illustrated in FIG. 8 and the modified example of the cover 200 illustrated in FIG. 9 are considered, an elastic force and a support force of the protrusion 230 may be adjusted by adjusting a bending position of the second region 232 to adjust a position of the end portion of the second region 232 of the protrusion 230.

Meanwhile, the plurality of protrusions 230 may be disposed on the lower surface 221 of the protruding part 220 to have predetermined separation gaps in the circumferential direction. As illustrated in FIGS. 6 and 7, the separation gaps include first separation gaps G1 and second separation gaps G2, and the first separation gap G1 may be smaller than the second separation gap G2. In this case, the separation gaps may be defined as gaps between protrusions 230 in the circumferential direction.

That is, the plurality of protrusions 230 are disposed on the lower surface 221 of the protruding part 220 to have the predetermined separation gaps in the circumferential direction, and the separation gaps may include at least two first separation gaps G1 and at least two second separation gaps G2. In addition, the at least two first separation gaps G1 may be disposed symmetrically with respect to a virtual line L crossing the center C. In addition, the at least two second separation gaps G2 may also be disposed symmetrically with respect to the line L.

Meanwhile, two protrusions 230 disposed adjacent to each other in the circumferential direction may be disposed to have a predetermined central angle in the circumferential direction. In this case, the central angle may be defined as an intersection angle formed by the two protrusions around the center C.

Accordingly, one protrusion 230 and any one protrusion 230 among two other protrusions 230 disposed adjacent to the one protrusion 230 in the circumferential direction may form a first central angle θ1. In addition, the one protrusion 230 and the other protrusion 230 among the two other protrusions 230 disposed adjacent to the one protrusion 230 may form a second central angle θ2. In this case, the first central angle θ1 may be smaller than the second central angle θ2.

For example, the protrusion 230 disposed to be spaced counterclockwise from the one protrusion 230 may be disposed to have the first central angle θ1. In addition, the protrusion 230 disposed to be spaced clockwise from the one protrusion 230 may be disposed to have the second central angle θ2.

Accordingly, the cover 200 may include the plurality of protrusions 230 formed to have at least two first central angles θ1 and at least two second central angles θ2, and the at least two first central angles θ1 may be disposed symmetrically with respect to the line L. In addition, the at least two second central angles θ2 may also be disposed symmetrically with respect to the line L.

For example, the plurality of protrusions 230 of the cover 200 may include first protrusions 230a, second protrusions 230b, and third protrusions 230c. In this case, the first protrusions 230a may be disposed to be spaced apart from each other between the second protrusions 230b and the third protrusions 230c in the circumferential direction. In addition, each of the first protrusions 230a and each of the second protrusions 230b may be disposed so that the first central angle θ1 is formed around the center C, and the first protrusion 230a and the third protrusions 230c may be disposed so that the second central angle θ2 is formed around the center C. In addition, the first central angle θ1 may be smaller than the second central angle θ2. In this case, the first protrusions 230a, the second protrusions 230b, and the third protrusions 230c may be disposed symmetrically with respect to the virtual line L which crosses the center C.

In this case, the first central angle θ1 may be defined as an intersection angle between a virtual line connecting the center C and a center C1 of the first protrusion 230a and a virtual line connecting the center C and a center C2 of the second protrusion 230b. In addition, the second central angle θ2 may be defined as an intersection angle between the virtual line connecting the center C and the center C1 of the first protrusion 230a and a virtual line connecting the center C and a center C3 of the third protrusion 230c.

When the housing 100 and the cover 200 are coupled in a press-fit manner, the curved surface 240 minimizes the generation of debris such as a burr.

The curved surface 240 may be formed by bending a partial region of the protrusion 230 in a direction opposite to a protruding direction. As illustrated in FIG. 8, the curved surface 240 may be formed to have a predetermined curvature, and a radius of curvature of the curved surface 240 may be the same as the radial thickness T1 of the protruding part 220 or a radial thickness of the first region 231. For example, when the radial thickness T1 of the protruding part 220 is 1.2 mm, the radius of curvature may be 1.2 mm.

That is, since the curved surface 240 is formed by bending, the curved surface 240 may be formed to have a sufficient size to reduce the debris.

When the curved surface 240 is not formed to have the sufficient size, debris may be generated excessively at an initial stage of press-fit of the cover like a cover in which a curved surface is not formed.

Accordingly, in the cover 200, the sufficient size of the curved surface 240 may be secured in a forming manner of bending to manage the curvature and secure performance. In addition, since the curved surface 240 may be formed by only bending without an additional machining process such as rounding, a time and costs due to the machining process can be reduced.

The support 250 may be formed to protrude from an inner circumferential surface formed due to the first hole 211 in the axial direction. Accordingly, the support 250 may extend the first hole 211 in the axial direction.

In addition, the support 250 may support an outer wheel of the bearing B. Accordingly, the support 250 may be called a cover pocket.

Figure 10:
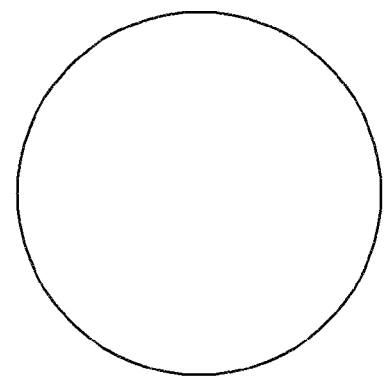
FIG. 10 is a set of views illustrating a manufacturing process of the cover of the motor according to the embodiment.
Figure 10:
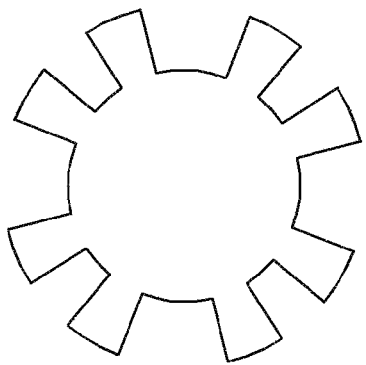
Figure 10:
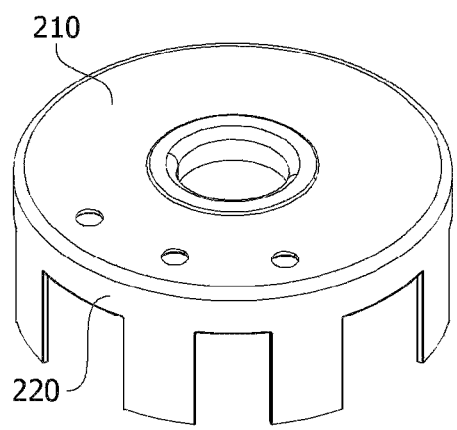
Figure 10:
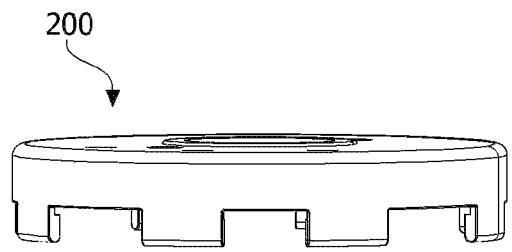

FIG. 10 is a set of views illustrating a manufacturing process of the cover of the motor according to the embodiment. FIG. 10A is a view illustrating a disc-shaped material, FIG. is a view illustrating a primary part formed through a trimming process, FIG. 10C is a view illustrating a secondary part formed through a drawing process, and FIG. 10D is a view illustrating a tertiary part on which a curved surface is formed through a bending process.

The disc-shaped material illustrated in FIG. 10A may be trimmed and molded into the primary part illustrated in FIG. 10B.

In addition, the primary part may be drawn and molded into the secondary part illustrated in FIG. 10C.

In addition, as illustrated in FIG. 10D, protrusions formed on a lower portion of the secondary part may be bent and molded into the tertiary part having the curved surfaces 240 of the cover 200 according to the embodiment. In addition, the cover 200 may be implemented by forming the first hole 211, the second hole 212, and the support 250 on the tertiary part through a punching and drawing process.

That is, the cover 200 according to the embodiment may be molded and manufactured through the processes illustrated in FIG. 10 and the like. Particularly, since the curved surface 240 of the cover 200 is formed through the bending process, an additional molding process for forming the curved surface 240 may be eliminated.

The stator 300 induces an electrical interaction with the rotor 400 to induce rotation of the rotor 400.

The stator 300 may be disposed inside the housing 100. In this case, the stator 300 may be supported by the inner circumferential surface of the housing 100. In addition, the stator 300 may be disposed outside the rotor 400. That is, the rotor 400 may be rotatably disposed inside the stator 300.

Referring to FIGS. 2 and 3, the stator 300 may include a stator core 310, an insulator 320 disposed on the stator core 310, and coils 330 wound around the insulator 320.

The coils 330 which generate a rotating magnetic field may be wound around the stator core 310. In this case, the stator core 310 may be formed as a one core or formed by coupling a plurality of divided cores.

The stator core 310 may be formed in a shape in which a plurality of thin steel plates are stacked on each other but is not necessarily limited thereto. For example, the stator core 310 may be formed as a single part.

The stator core 310 may include a yoke and a plurality of teeth protruding from the yoke in the radial direction.

The yoke may be formed in a cylindrical shape. Accordingly, the yoke may include a cross section having a ring shape when viewed from above.

The plurality of teeth may be disposed to be spaced apart from each other in a circumferential direction of the yoke. Accordingly, slots, which are spaces in which the coils 330 are wound, may be formed between the teeth.

The insulator 320 insulates the stator core 310 from the coils 330. Accordingly, the insulator 320 may be disposed between the stator core 310 and the coils 330.

Accordingly, the coils 330 may be wound around the stator core 310 on which the insulator 320 is disposed.

The rotor 400 rotates due to an electrical interaction with the stator 300. In this case, the rotor 400 may be rotatably disposed with respect to the stator 300.

The rotor 400 may include a rotor core 410 and a plurality of magnets 420 disposed outside the rotor core 410. In addition, the rotor 400 may include a can to inhibit the magnets 420 from being separated and increase a coupling force. In this case, the can may be disposed outside the rotor core 410 to which the magnets 420 are coupled. In addition, the magnets 420 may be disposed on the rotor core 410 to be spaced a predetermined interval from each other in the circumferential direction around the center C.

The rotor core 410 may be formed in a shape in which a plurality of thin steel plates are stacked or in a shape of one cylinder.

In addition, a hole to which the shaft 500 is coupled may be formed at the center C of the rotor core 410.

The magnets 420 and the coils 330 wound around the stator core 310 of the stator 300 generate a rotating magnetic field. In this case, the magnets 420 may be disposed outside the rotor core 410 to implement a surface permanent magnet (SPM) type rotor.

Accordingly, the rotor 400 rotates due to an electrical interaction between the coils 330 and the magnets 420, and the shaft 500 rotates in conjunction with the rotation of the rotor 400 to generate a driving force of the motor.

The can may protect the rotor core 410 and the magnets 420 from physical or chemical stimuli. In addition, the can may inhibit the magnets 420 from being separated from the rotor core 410. In this case, the can may be disposed to cover the magnets 420 disposed on the rotor core 410.

The shaft 500 may be disposed inside the housing 100 to be rotatable by the bearing B. In addition, the shaft 500 may rotate in conjunction with the rotation of the rotor 400.

The shaft 500 may be coupled to the hole formed at the center of the rotor core 410 in a press-fit manner.

As illustrated in FIGS. 2 and 3, the busbar 600 may be disposed on the stator 300. In addition, the busbar 600 may be electrically connected to the coils 330 of the stator 300.

The busbar 600 may include a busbar body 610 formed of an insulating material and a plurality of busbar terminals 620 disposed on the busbar body 610.

The busbar body 610 may be formed in a ring shape.

The busbar body 610 may be a mold part formed by injection molding. Accordingly, the busbar body 610 may be injection-molded to form the busbar 600 in a state in which the plurality of busbar terminals 620 are disposed to be spaced apart from each other in the radial direction.

One side of the busbar terminal 620 may be electrically connected to one of the coils 330 of the stator 300. In addition, the other side of the busbar terminal 620 may be electrically connected to an external power source.

In addition, the plurality of busbar terminals 620 may be disposed to be spaced apart from each other in the radial direction. For example, the plurality of busbar terminals 620 may be disposed on the busbar body 610 to be spaced apart from each other in the radial direction around the center C.

The busbar terminal 620 may be electrically connected to a connector (not shown) provided for applying external power. Accordingly, as illustrated in FIG. 1, one side of the busbar terminal 620 may pass through the cover 200 and may be exposed to the outside.

Accordingly, the power may be supplied to the coil 330 through the busbar terminal 620.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS

100: HOUSING, 200: COVER, 210: PLATE, 220: PROTRUDING PART, 230: PROTRUSION, 231: FIRST REGION, 232: SECOND REGION, 240: CURVED SURFACE, 300: STATOR, 400: ROTOR, 500: SHAFT, 600: BUSBAR

What is claimed is:

1. A motor comprising:
a housing in which an opening is formed;
a stator disposed in the housing;
a rotor disposed to correspond to the stator;
a shaft coupled to the rotor; and
a cover disposed to cover the opening,
wherein the cover includes a plate, a protruding part formed to protrude from the plate in an axial direction, and a plurality of protrusions formed to protrude from the protruding part in the axial direction,
wherein an outer circumferential surface of the protrusion contacts an inner circumferential surface of the housing, and
wherein a radial thickness (T2) of each of the protrusions is greater than a radial thickness (T1) of the protruding part.

2. The motor of claim 1, wherein the radial thickness (T2) of the protrusion is twice the radial thickness (T1) of the protruding part.

3. The motor of claim 1, wherein:
the cover includes a curved surface formed on a lower end of the protrusion to have a predetermined curvature; and
a radius of curvature of the curved surface is the same as the radial thickness (T1) of the protruding part.

4. The motor of claim 3, wherein the curved surface is formed by bending one region of the protrusion.

5. The motor of claim 3, wherein the protrusion includes:
a first region extending downward from a lower surface of the protruding part in the axial direction; and
a second region bent upward from an end portion of the first region in the axial direction.

6. The motor of claim 5, wherein the second region is disposed in contact with an inner side of the first region.

7. The motor of claim 5, wherein the first region includes:
a 1-1 region extending downward from the lower surface of the protruding part in the axial direction; and
a 1-2 region extending from the 1-1 region,
wherein the 1-2 region is disposed to overlap the second region in a radial direction.

8. The motor of claim 5, wherein an end portion of the second region is disposed to overlap a part of a lower portion of an inner circumferential surface of the protruding part in a radial direction.

9. The motor of claim 5, wherein a distance (d2) from a lower surface of the plate to an end portion of the second region is smaller than a distance (d1) from the lower surface of the plate to the lower surface of the protruding part.

10. The motor of claim 1, wherein:
the plurality of protrusions are disposed on a lower surface of the protruding part to have predetermined separation gaps in a circumferential direction;
the separation gaps include a first separation gap (G1) and a second separation gap (G2); and
the first separation gap (G1) is smaller than the second separation gap (G2).

11. The motor of claim 1, wherein:
the plurality of protrusions are disposed on a lower surface of the protruding part to have predetermined separation gaps in a circumferential direction;
the separation gaps include a plurality of first separation gaps (G1) and a plurality of second separation gaps (G2); and
the first separation gaps (G1) are disposed symmetrically with respect to a virtual line (L) crossing a center (C).

12. The motor of claim 1, wherein:
the plurality of protrusions are disposed on a lower surface of the protruding part to be separated from each other in a circumferential direction;
two protrusions disposed adjacent to each other in the circumferential direction among the protrusions are disposed to have a predetermined central angle;
one protrusion and any one protrusion among two protrusions disposed adjacent to the one protrusion in the circumferential direction are disposed to have a first central angle ($\theta 1$);
the one protrusion and the other protrusion among the two protrusions disposed adjacent to the one protrusion in the circumferential direction are disposed to have a second central angle ($\theta 2$); and
the first central angle ($\theta 1$) is smaller than the second central angle ($\theta 2$).

13. The motor of claim 1, wherein:
the plurality of protrusions are disposed on a lower surface of the protruding part to be separated from each other in a circumferential direction;
the plurality of protrusions include first protrusions, second protrusions, and third protrusions;
the first protrusion is disposed between the second protrusion and the third protrusion in the circumferential direction;
the first protrusion and the second protrusion are disposed to form a first central angle ($\theta 1$) around a center (C);
the first protrusion and the third protrusion are disposed to form a second central angle ($\theta 2$) around the center (C); and
the first central angle ($\theta 1$) is smaller than the second central angle ($\theta 2$).

14. The motor of claim 13, wherein the first protrusions, the second protrusions, and the third protrusions are disposed symmetrically with respect to a virtual line (L) crossing the center (C).

15. A cover comprising:
a plate;
a protruding part formed to protrude from the plate in an axial direction;
a plurality of protrusions formed to protrude from the protruding part in the axial direction; and
a curved surface formed to have a predetermined curvature on a lower end of each of the protrusions,
wherein the protrusion includes a first region extending downward from a lower surface of the protruding part in the axial direction and a second region bent upward from an end portion of the first region in the axial direction,
the second region is disposed in contact with an inner side of the first region, and
a radial thickness (T2) of the protrusion is greater than a radial thickness (T1) of the protruding part.

16. The cover of claim 15, wherein:
the cover includes a curved surface formed on a lower end of the protrusion to have a predetermined curvature; and
a radius of curvature of the curved surface is the same as the radial thickness (T1) of the protruding part.

17. The cover of claim 15, wherein:
the plurality of protrusions are disposed on a lower surface of the protruding part to have predetermined separation gaps in a circumferential direction;
the separation gaps include a first separation gap (G1) and a second separation gap (G2); and
the first separation gap (G1) is smaller than the second separation gap (G2).

18. The cover of claim 15, wherein:
the plurality of protrusions are disposed on a lower surface of the protruding part to have predetermined separation gaps in a circumferential direction;
the separation gaps include a plurality of first separation gaps (G1) and a plurality of second separation gaps (G2); and
the first separation gaps (G1) are disposed symmetrically with respect to a virtual line (L) crossing a center (C).

19. The cover of claim 15, wherein:
the plurality of protrusions are disposed on a lower surface of the protruding part to be separated from each other in a circumferential direction;
two protrusions disposed adjacent to each other in the circumferential direction among the protrusions are disposed to have a predetermined central angle;
one protrusion and any one protrusion among two protrusions disposed adjacent to the one protrusion in the circumferential direction are disposed to have a first central angle ($\theta 1$);
the one protrusion and the other protrusion among the two protrusions disposed adjacent to the one protrusion in the circumferential direction are disposed to have a second central angle ($\theta 2$); and
the first central angle ($\theta 1$) is smaller than the second central angle ($\theta 2$).

20. The cover of claim 15, wherein:
the plurality of protrusions are disposed on a lower surface of the protruding part to be separated from each other in a circumferential direction;
the plurality of protrusions include first protrusions, second protrusions, and third protrusions;
the first protrusion is disposed between the second protrusion and the third protrusion in the circumferential direction;
the first protrusion and the second protrusion are disposed to form a first central angle ($\theta 1$) around a center (C);
the first protrusion and the third protrusion are disposed to form a second central angle ($\theta 2$) around the center (C); and
the first central angle ($\theta 1$) is smaller than the second central angle ($\theta 2$).

* * * * *